Patented Sept. 4, 1951

2,566,659

UNITED STATES PATENT OFFICE 2,566,659

SILVER HALIDE EMULSIONS CONTAINING ANTIFOGGING AGENTS

Douglas James Fry, Ilford, England, assignor to Ilford Limited, Ilford, England, a British company No Drawing. Application November 17, 1949, Serial No. 128,026. In Great Britain November 23, 1948

3 Claims. (Cl. 95—7)

This invention relates to photographic materials and particularly to photographic materials comprising a light-sensitive gelatino silver halide emulsion.

It is well known that light-sensitive gelatino silver halide emulsions tend to yield, on development, a deposit of silver even in those areas which have not been exposed to light. This, more or less uniform, deposit is generally referred to as "chemical fog" and is disadvantageous in degrading the highlights of the developed negative or print. The tendency to the formation of fog is increased on keeping the emulsion, so that photographic materials which have been stored for a long time, especially in humid conditions, generally show a high "fog" density. The tendency to the formation of fog is also increased by development at high temperature, e. g. in tropical conditions. Photographic gelatino silver-halide emulsions may be stabilised against the changes which give rise to fog, and the general level of fog may be reduced by adding to the emulsions various organic compounds. Such additions, however, frequently adversely affect the other sensitometric characteristics of the emulsions, e. g. the speed and contrast characteristics of the emulsions.

According to the present invention gelatino silver halide photographic emulsions contain a small quantity of a compound of the general formula:

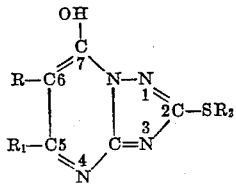

where R is hydrogen, alkyl, aralkyl, aryl, alicyclic or heterocyclic, $R_1$ is alkyl, aralkyl, aryl, alicyclic or heterocyclic, or is an amino, hydroxy or carbalkoxy group, and $R_2$ is hydrogen, alkyl or aralkyl. R and $R_1$ may also jointly constitute the residue of a ring system joining the 5- and 6-positions.

Such emulsions show a much reduced tendency to develop fog, but their sensitometric characteristics are otherwise substantially unaffected by the added compounds.

Compounds of the foregoing general formula may be obtained by reacting 2-amino-5-methylmercapto-1:3:4-triazole or a 2-amino-5-mercapto-1:3:4-triazole with a β-ketonic ester, a cyclic β-keto ester, or a malonic or cyanacetic ester. β-Ketonic esters yield variously substituted compounds according to the particular β-ketonic ester employed. A suitable β-ketonic ester is acetoacetic ester and a suitable cyclic β-keto ester is ethyl cyclohexanone-2-carboxylate. Cyclic β-keto esters produce substances in which $R_1$ and $R_2$ jointly form the residue of an alicyclic ring linking the 5- and 6-positions.

The general formula assigned to the products of these processes is believed to be correct and follows the general lines of the structure for other compounds of similar type referred to in Beilstein's Handbuch der Organische Chemie, Volume XXVI, page 4117. However, it is to be understood that the compounds employed in the present invention are the compounds obtained by the processes outlined above whatever their chemical structure may ultimately prove to be.

Only very small quantities of the compounds are necessary to stabilise the emulsions against the development of fog. For example, a range of quantities of 0.02 g. to 1 g. for an emulsion containing 1½ g. mols. silver iodobromide is usually sufficient.

The following is an example of the production of a typical compound for use in the present invention:

*Example 1*

Preparation of the compound of the formula:

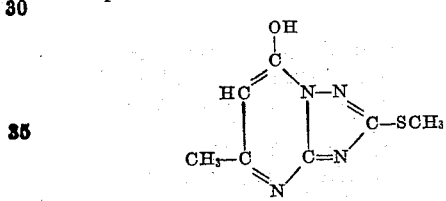

2.4 gms. of 2-methyl mercapto-5-amino-1:3:4-triazole (1 mol.) is mixed with 2.4 cc. ethyl-acetoacetate (1 mol.) in 15 cc. glacial acetic acid. The mixture is boiled for 8 hours, cooled, and the precipitated product removed by filtration. It may be purified by recrystallising from acetic acid. M. pt. 282° C. The same product is obtained by heating together the triazole and ethyl-acetoacetate at 140–60° C. for half an hour.

Thus, for example, 0.5 g. of the compound obtained by the process of the foregoing Example 1 was added (dissolved in water, dilute caustic soda or ethyl alcohol) to an emulsion containing 1½ g. mols. of silver iodobromide, and the emulsion was then coated on a support. A "control" coating was made with emulsion not containing the said compound. Specimens of the control and test emulsions were tested for fog density and speed after storage for 8 days under normal conditions (normal keeping). Further specimens were stored in a sealed container for 8 days at 120° F. The following table shows the results obtained.

|  | Normal Keeping | | 8 Days at 120° F. | |
|---|---|---|---|---|
|  | Fog density | Relative log speed | Fog density | Relative log speed |
| Control | 0.04 | 3.69 | 0.12 | 3.80 |
| Test | 0.02 | 3.60 | 0.03 | 3.68 |

It will be seen that whereas the fog density of the control increased considerably on keeping at 120° F., that of the test specimens did not, and that the speed of the emulsion was substantially unaffected.

*Example 2*

Preparation of the compound of the formula:

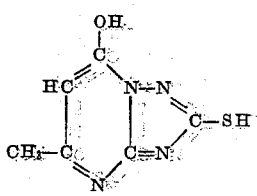

1.16 gms. of 2-mercapto-5-amino-1:3:4-triazole (1 mol.) and 1.3 cc. ethylacetoacetate (1 mol.) are mixed in 25 cc. acetic acid and the whole refluxed for 10 hours. After cooling, the product is isolated by filtration and recrystallised from water. It melts above 290° C.

*Example 3*

Preparation of the compound of the formula:

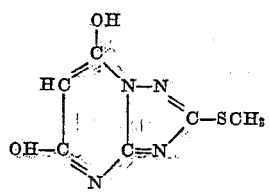

Prepared as in Example 1, using 1.3 gm. 2-methylmercapto-5-amino-1:3:4-triazole, 1.6 cc. ethyl malonate and 5 cc. glacial acetic acid. After recrystallisation from aqueous acetic acid the product melted at 244° C.

This product was added to a silver iodobromide emulsion at the rate of 0.5 gm. substance per 1½ g. mols. silver halide and the emulsion coated on a support. A "control" coating was made with emulsion not containing the product. Specimens of the control and test coatings were tested for fog density and speed immediately after coating. Further specimens were stored in a sealed container for 8 days at 120° F. The following table shows the results obtained.

|  | Initial Test | | After 8 Days at 120° F | |
|---|---|---|---|---|
|  | Fog density | Relative log speed | Fog density | Relative log speed |
| Control | 0.04 | 3.75 | 0.19 | 3.75 |
| Test | 0.01 | 3.76 | 0.08 | 3.88 |

*Example 4*

Preparation of the compound of the formula:

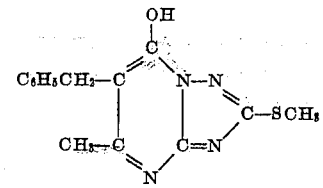

Prepared as in Example 1, using 1.3 gm. 2-methylmercapto-5-amino-1:3:4-triazole and 2.2 gm. ethylbenzylacetoacetate in 5 cc. glacial acetic acid. After recrystallisation from acetic acid the product melted at 276° C.

*Example 5*

Preparation of the compound of the formula:

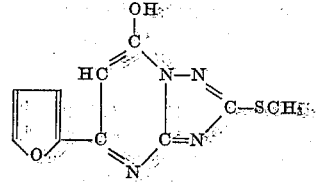

Prepared as in Example 4, but using 1.3 gm. 2-methylmercapto-5-amino-1:3:4-triazole and 1.8 gm. ethyl furoylacetate. After recrystallisation from acetic acid the product melted at 284° C.

*Example 6*

Preparation of the compound of the formula:

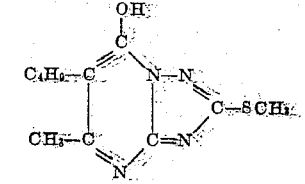

Prepared as in Example 1, using 1.3 gm. 2-methylmercapto-5-amino-triazole and 1.85 gm. ethyl butylacetoacetate. After recrystallisation from aqueous acetic acid the product melted at 212° C.

*Example 7*

Preparation of the compound of the formula:

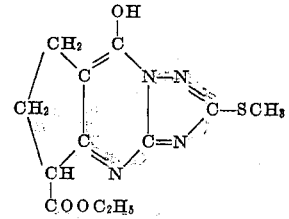

1.3 gm. 2-methyl mercapto-5-amino-1:3:4-triazole and 2.24 gm. ethyl cyclopentanone-2:5-dicarboxylate are mixed in 8 cc. of acetic acid and the whole boiled for 1 hour. The product is collected by filtration and after crystallisation from aqueous acetic acid melts above 300° C.

*Example 8*

Preparation of the compound of the formula:

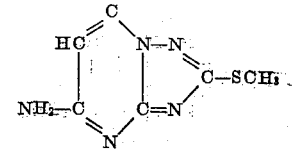

3.25 gm. 2-methyl mercapto-5-amino-1:3:4-triazole and 2.8 gm. ethyl cyanacetate are dissolved in a solution of sodium ethoxide prepared by dissolving 0.55 gm. sodium in 12 cc. ethyl alcohol. The solution is boiled for 4 hours, cooled and acidified with dilute hydrochloric acid. The product is isolated by concentrating to a small bulk. It melts above 290° C.

While detailed photographic data are given above only for the products of Examples 1 and 3, it will be understood that any of the compounds of Examples 2, 4, 5, 6, 7 and 8 may be similarly employed with like effect.

What I claim is:

1. A photographic gelatino silver halide emulsion containing a small quantity of a compound of the general formula:

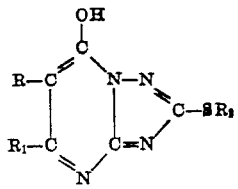

where R is selected from the class consisting of the hydrogen atom and alkyl, aralkyl, aryl, alicyclic and heterocyclic groups, $R_1$ is selected from the class consisting of alkyl, aralkyl, aryl, alicyclic, heterocyclic, amino, hydroxy and carbalkoxy groups and, together with R, divalent groups linking the carbon atoms to which R and $R_1$ are attached, and $R_2$ is selected from the class consisting of the hydrogen atom and alkyl and aralkyl groups.

2. A photographic gelatino silver halide emulsion containing a small quantity of a compound of the general formula:

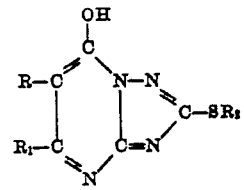

where R is selected from the class consisting of the hydrogen atom and alkyl, aralkyl, aryl, alicyclic and heterocyclic groups, $R_1$ is selected from the class consisting of alkyl, aralkyl, aryl, alicyclic, heterocyclic, amino, hydroxy and carbalkoxy groups and, together with R, divalent groups linking the carbon atoms to which R and $R_1$ are attached, and $R_2$ is selected from the class consisting of the hydrogen atom and alkyl and aralkyl groups, the quantity of such compound being between 0.02 g. to 1 g. per 1½ g. mols. silver halide in the emulsion.

3. A photographic gelatino silver iodobromide emulsion containing a small quantity of a compound of the general formula:

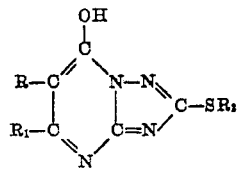

where R is selected from the class consisting of the hydrogen atom and alkyl, aralkyl, aryl, alicyclic and heterocyclic groups, $R_1$ is selected from the class consisting of alkyl, aralkyl, aryl, alicyclic, heterocyclic, amino, hydroxy and carbalkoxy groups and, together with R, divalent groups linking the carbon atoms to which R and $R_1$ are attached, and $R_2$ is selected from the class consisting of the hydrogen atom and alkyl and aralkyl groups, the quantity of such compound being between 0.02 g. to 1 g. per 1½ g. mols. silver iodobromide in the emulsion.

DOUGLAS JAMES FRY.

REFERENCES CITED

The following references are of record in the file of this patent:

UNITED STATES PATENTS

| Number | Name | Date |
|---|---|---|
| 2,449,225 | Heimbach et al. | Sept. 14, 1948 |
| 2,476,536 | Dersch | July 19, 1949 |